Patented Nov. 10, 1953

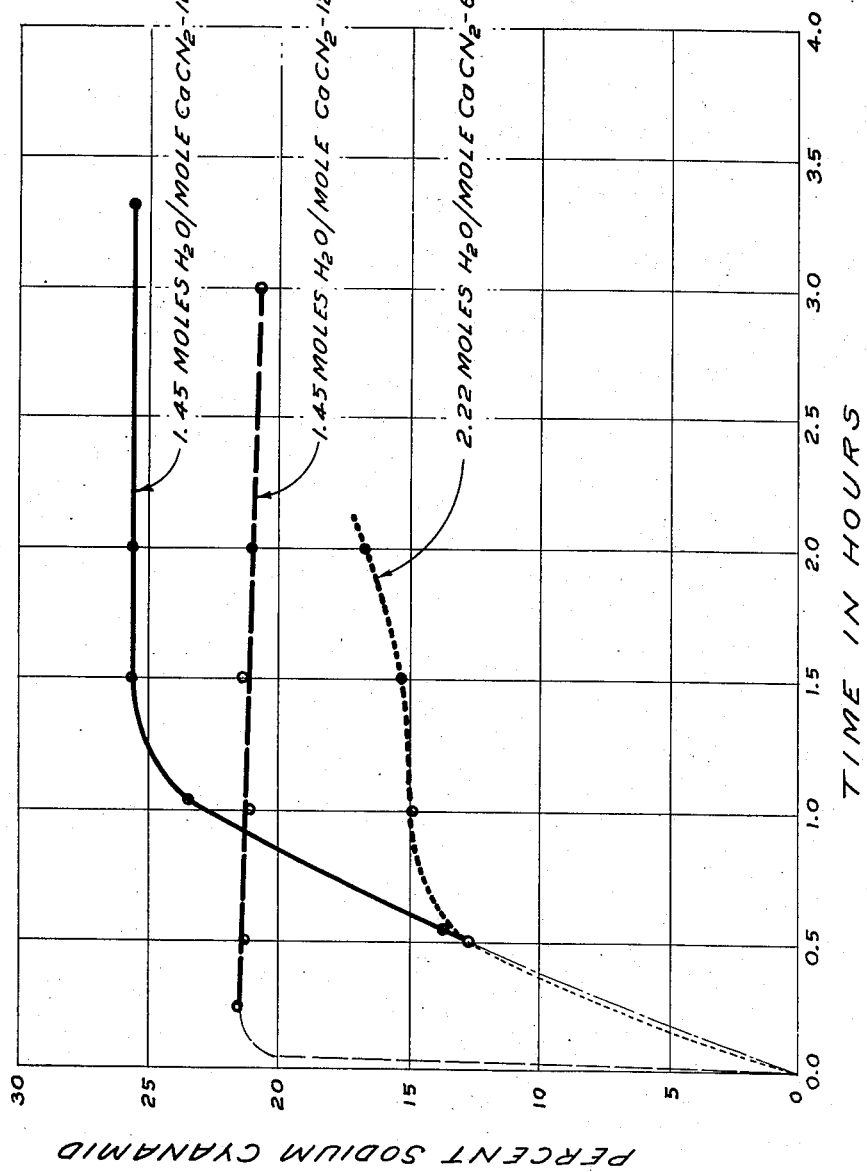

2,658,825

UNITED STATES PATENT OFFICE 2,658,825

PREPARATION OF PRODUCT CONTAINING SODIUM ACID CYANAMIDE

Raymond A. Vingee, Stamford, and Louis L. Lento, Jr., Springdale, Conn., assignors to American Cyanamid Company, New York, N. Y., a corporation of Maine Application November 23, 1949, Serial No. 129,165

5 Claims. (Cl. 71—2.2)

The present invention relates to the preparation of a defoliant containing an alkali metal acid cyanamide.

It is an object of the invention to prepare such a defoliant in greater yield and at considerably less cost than has been possible in the past. A further object is to react calcium cyanamide and an alkali metal hydroxide in an aqueous medium with small loss of cyanamide nitrogen and with high conversion of calcium cyanamide to alkali metal acid cyanamide. A still further object is to dry the aqueous reaction mass under conditions that result in minimum decomposition. Additional objects will be apparent from the discussion hereinafter.

In arid regions, which are comparatively dewless, the alkali metal acid defoliants are considerably superior to calcium cyanamide. However, their application prior to the present invention was inhibited by their high cost, there being no means known to prepare them commercially in a price range comparable to that of calcium cyanamide. Such an economic means is disclosed in the present invention.

The figure of the accompanying drawing shows the effect of various temperatures and reaction times on the yield of sodium acid cyanamide.

The probable reaction mechanism in converting calcium cyanamide to an alkali metal acid cyanamide can be written rather simply:

1. 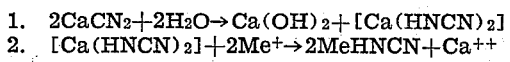
2. [Ca(HNCN)$_2$]+2Me$^+$→2MeHNCN+Ca$^{++}$

The ease with which this reaction can be carried out is, however, more apparent than real. Actually, it is very difficult to obtain good yields of alkali metal acid cyanamide by the above reaction. The main difficulty is the decomposition resulting from the evaporation of the aqueous medium. In these side reactions, cyanamide nitrogen tends to be converted to urea, ammonia, and the like. As a matter of fact, in investigating conditions necessary to provide a maximum yield of alkali metal acid cyanamide while simultaneously reducing the decomposition of cyanamide nitrogen to a minimum, it was found that several factors were critical, such as the amount of water in the reaction mass, the temperature of reaction, the alkali metal compound chosen, and the reaction time.

The following example illustrates without limiting the invention.

Example

Into the feed-in of a pug mill of 75 lbs. per hour capacity is continuously charged at the rate of 50 lbs. per hour a mixture consisting of 9 lbs. of lime nitrogen, 2 lbs. of water, 3 lbs. of sodium hydroxide, and ⅓ lb. of a wetting agent of the type described in more detail below. The method of preparing and feeding the charge is not critical. Solids may be added to liquid, or vice versa. The pug mill is heated by means of a steam jacket or the like so that a temperature of 100° C. is maintained. Using the above ratio of feed-to-capacity, the residence time of 1½ hours is obtained, and the product leaving the mill is found to contain about 25% sodium acid cyanamide, and to be nearly dry. The water content is 1–1.5%. The product so obtained may be ground and applied as a defoliant without further treatment. If a lengthy storage period is contemplated, however, it is preferably dried further to a water content of 0.5–0.7% in an auxiliary drier.

It is a remarkable feature of the invention that at least four elements of the reaction are critical, namely:

1. The time of reaction must be at least 1 hour.
2. The temperature of the reaction must lie within the range 90°–110° C.
3. The alkali metal reactant must be a hydroxide.
4. The amount of water used per mol of calcium cyanamide must be at least 1 mol but not more than 2 mols. For best operation, no more than 1.5 mols of water per mol of calcium cyanamide is preferred.

Wetting agent

While it is not necessary to use a wetting agent in the process, it has been found that the addition of a small amount—even as low as one part in 500 parts of reactants—reduces the consistency of the reaction mass to a remarkable degree and permits the use of a minimum amount of water and a minimum amount of power consumption in stirring the mass. The result is a shorter reaction period with an overall gain in the grade of sodium acid cyanamide. Thus, the use of a wetting agent serves two unrelated ends, namely, it improves the grade of material while simultaneously produces a product that can be used as such in arid areas. The wetting agent used should be stable to calcium ions. Among such wetting agents are the various sulfonated wetting agents such as Turkey red oil, the wetting agent known as "nytron," made by reacting long-chain olefins with nytrosyl chloride and preparing an adduct with sodium sulfite. Still other suitable wetting agents are the alkylated aryl sulfonates, such as "naccanol," "aerosol OS," and the like.

Of course, the wetting agents chosen must be stable within the temperature range 90°–110° C.

Time of reaction

As will be noted from Fig. 1, the yield of sodium acid cyanamide (using the critical amount of water and a temperature within the critical range) begins to reach the optimum only after a reaction period of about 1 to 1¼ hours, and a maximum only after 1½ hours. It will be seen, therefore, that the rate of feed into the apparatus must be controlled to give a residence time (or reaction time) of at least 1 hour to 1½ hours.

Temperature of reaction

From Fig. 1 it will be noted that reaction temperatures of 60° and 120° C. respectively fail to provide the desired grade of sodium acid cyanamide. The temperature range 90°–110° C. is critical and deviations therefrom will result in a non-commercial grade of defoliant.

Alkali metal reactant

It has been found that only the alkali metal hydroxides can be used in this process. This group includes sodium hydroxide, potassium hydroxide, and the like. Potassium hydroxide gives a slightly better product than sodium hydroxide, but owing to the low cost of the latter, sodium hydroxide is preferred. Using the same critical conditions, when the process is run with a non-hydroxide material, for example sodium carbonate, the yield of sodium acid cyanamide dropped to 1.12%.

Water

While it is necessary to use an amount of water sufficient to insure an ionic double decomposition reaction, it is also important to keep the volume of water low in order to avoid a long evaporating period which tends to decompose the cyanamide ion. It will be readily appreciated that the amount of water suitable from the commercial production of sodium acid cyanamide is critical and falls within a narrow range. Obviously, at least a stoichiometric quantity of water should be present. However, beyond this amount that quantity present should be reduced as much as possible to avoid excessive drying times. It has been found that no more than 2 mols of water per mol of contained calcium cyanamide can be used if a commercial grade of defoliant is to be obtained, and it is greatly preferred to use even less, namely about 1.0–1.5 mols of water.

Calcium cyanamide

The calcium cyanamide need not be pure, and, as a matter of fact, the rather impure commercial calcium cyanamide known as lime nitrogen is quite satisfactory for use in practicing this invention. When using lime nitrogen the stoichiometric quantity of calcium cyanamide should be calculated on the basis of the amount contained in the lime nitrogen. This will generally fall within the range 56–69%. In the interests of economy the amount of alkali metal hydroxide or cyanamide should be approximately theoretical, though a commercial grade of defoliant can be obtained when the amount of hydroxide is only 80% of theoretical.

Reference is made to application Serial No. 221,532, filed April 17, 1951, which is a continuation-in-part of Serial No. 129,166, filed by one of the instant joint applicants with another.

While the invention has been described with particular reference to specific embodiments, it is to be understood that it is not to be limited thereto, but is to be construed broadly and restricted solely by the scope of the appended claims.

We claim:

1. The method of preparing a product containing an alkali metal acid cyanamide and calcium hydroxide comprising heating a mixture of calcium cyanamide, water, and an alkali metal hydroxide in the respective calcium:water:alkali metal hydroxide mol ratio of about 1:1–2:1, at a temperature of 90°–110° C. for at least one hour.

2. The method according to claim 1 in which a calcium-stable wetting agent is present.

3. The method according to claim 1 in which calcium cyanamide is present as lime nitrogen.

4. The method of preparing a defoliant containing sodium acid cyanamide and calcium hydroxide which comprises mixing water, lime nitrogen, and sodium hydroxide in the proportions of claim 1 to form a reaction mass; advancing said mass through a reaction zone maintained at approximately 90°–110° C. during a reaction period of at least 1 hour with appropriate agitation to drive off excess water, and recovering a substantially dry product at the terminus of said zone.

5. The method according to claim 4 in which a calcium-stable wetting agent is present in the reaction mass.

RAYMOND A. VINGEE.
LOUIS L. LENTO, Jr.

References Cited in the file of this patent

UNITED STATES PATENTS

| Number | Name | Date |
|---|---|---|
| Re. 12,762 | Frank | Mar. 10, 1908 |
| 796,713 | Foersterling | Aug. 8, 1905 |
| 1,196,910 | Washburn | Sept. 5, 1916 |
| 1,622,731 | Muckenfuss | Mar. 29, 1927 |
| 2,213,440 | Ashley et al. | Sept. 3, 1940 |
| 2,557,997 | Phelps et al. | June 26, 1951 |